US009673865B2

(12) United States Patent
Kanamaru et al.

(10) Patent No.: US 9,673,865 B2
(45) Date of Patent: Jun. 6, 2017

(54) CYCLOCOMPUTER

(71) Applicant: Cateye Co., Ltd., Osaka (JP)

(72) Inventors: Tsutomu Kanamaru, Osaka (JP);
Hiroshi Tanaka, Osaka (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 14/693,976

(22) Filed: Apr. 23, 2015

(65) Prior Publication Data

US 2015/0311953 A1    Oct. 29, 2015

(30) Foreign Application Priority Data

Apr. 23, 2014  (JP) ................................ 2014-089071

(51) Int. Cl.
*H04B 5/00* (2006.01)
*G01C 22/00* (2006.01)
*B62J 99/00* (2009.01)

(52) U.S. Cl.
CPC ......... *H04B 5/0031* (2013.01); *G01C 22/002* (2013.01); *B62J 2099/0013* (2013.01); *B62J 2099/0033* (2013.01); *B62J 2300/0013* (2013.01)

(58) Field of Classification Search
CPC .... G06K 19/0723; G06K 7/0008; H04B 5/02; H04B 5/0012; H04B 5/00; H04B 1/3888; H04W 84/18; H04W 88/06; H04W 76/02; H04M 1/7253; H04M 2250/02; H04M 1/0283; H04M 1/18; H04M 1/0214
USPC .................................... 455/41.1, 41.2, 575.8
See application file for complete search history.

(56) References Cited

U.S. PATENT DOCUMENTS

| | | | | |
|---|---|---|---|---|
| 5,553,007 | A | * | 9/1996 | Brisson ................ G01C 22/002 702/182 |
| 7,915,554 | B2 | * | 3/2011 | Ueda ....................... B62J 11/00 200/315 |
| 2010/0159953 | A1 | * | 6/2010 | Aubert ............. G06K 19/07749 455/456.2 |

(Continued)

FOREIGN PATENT DOCUMENTS

JP          02-83574 U      6/1990
WO    WO 2010/038198 A1    4/2010

OTHER PUBLICATIONS

Antonio Palmiro Volpentesta, "Interactions Patterns in NEC Interfaces for Applications and Services", Pro-VE 2013, IFIP AICT 408, pp. 324-334, 2013.

*Primary Examiner* — Nhan Le
(74) *Attorney, Agent, or Firm* — Arnstein & Lehr LLP

(57) ABSTRACT

A cyclocomputer includes: a body; a display provided on an upper surface of the body and displaying prescribed information; a storage provided in the body and storing therein data including at least a portion of the prescribed information; and an NFC tag provided in the body and allowing data communication with an NFC reader writer incorporated in a mobile wireless communication terminal. The cyclocomputer can transmit via the NFC tag to the mobile wireless communication terminal at least a portion of the data stored in the storage, and the cyclocomputer can receive from the mobile wireless communication terminal via the NFC tag at least a portion of other data stored in the mobile wireless communication terminal or input to the mobile wireless communication terminal via an operation unit of the mobile wireless communication terminal.

3 Claims, 6 Drawing Sheets

(56) References Cited

U.S. PATENT DOCUMENTS

| | | |
|---|---|---|
| 2012/0083705 A1 | 4/2012 | Yuen et al. |
| 2014/0000322 A1* | 1/2014 | Williams ............ E05B 73/0011 70/18 |
| 2014/0206954 A1* | 7/2014 | Yuen .................. A61B 5/02405 600/301 |

* cited by examiner

CYCLOCOMPUTER

BACKGROUND OF THE INVENTION

Field of the Invention

The present invention relates to a cyclocomputer attachable to a bicycle.

Description of the Background Art

Japanese Utility Model Laying-open No. 02-83574 discloses displaying on a display device installed in a vehicle a variety of information that is stored in an IC card brought into the vehicle.

A cyclocomputer attached to a bicycle and displaying a variety of information such as a travelling speed in a manner visible by the rider, has also been conventionally known.

In recent years, near field communication (NFC) technology is increasingly prevalent. A basic study of the NFC technology has been started with the technology under the name of Felica (registered trademark). The basic study of the NFC was started in the late 1980's, and the technology, started by Sony Corporation, has been standardized in recent years as contactless IC card communication (or the NFC communication). While NFC communication includes Felica, ISO/IEC 14443 TypeA (MIFARE (registered trademark)), ISO/IEC 14443 TypeB, and ISO15693 for differences in communication specifications, a chip embedded in a card accommodating all specifications (an NFC LSI chip) and a reader writer have appeared in recent years. The NFC communication is put in practical use as a commutation ticket for public transportation facilities, or electronic money used to pay small sums of money and also having a function as a commutation ticket, or Suica (registered trademark) (Felica) and taspo (registered trademark) (TypeA). In Japan, the technology has also been applied to driver's license, and the NFC standard of the TypeB specification has been applied thereto. The NFC standard of the ISO15693 specification is used for a tag for business use and the like. In Japan, a My Number Card, a successor to a basic resident registry card, is scheduled to be introduced in January, 2016, with an NFC LSI chip embedded therein.

A cyclocomputer is attached to a bicycle, and accordingly, it is desirable that the cyclocomputer be small in size. On the other hand, it is desirable that the cyclocomputer have a display having a size of some extent to display information. As the small-size cyclocomputer is required to ensure a display having an area of a size of some extent, the cyclocomputer is limited in terms of the size of a user interface used for input to and output from the cyclocomputer. For example, it is difficult to provide the cyclocomputer at an external surface thereof with numeric key pads, as it is necessary to ensure the display's area.

Accordingly, cyclocomputer dealers have a setting device installed in their shops and dedicated to cyclocomputers for initializing them, such as inputting data such as a cumulative travelled distance, a circumferential length of a tire of a bicycle, a current time, a date, and the like. The setting device can be used to input predetermined information to a new cyclocomputer device.

Furthermore, some riders may ride different bicycles for different purposes, and in such a case, it is desirable that a cyclocomputer can be shared among the different bicycles. Sharing a cyclocomputer among different bicycles, however, requires rewriting information such as a tire's circumferential length stored in the cyclocomputer, and it is unrealistic to visit a dealer whenever such a rewriting operation is required. Conventionally, such rewriting necessitates using a limited user interface, such as a few number of switches. For example, when a user is required to use two switches to enter a 4-digit number, the user must press the switches repeatedly. As a result, it is difficult to share a single cyclocomputer among a plurality of bicycles or rewrite information such as a tire's circumferential length.

Furthermore, a cyclocomputer is attached to a bicycle, which is human-powered, and accordingly, the cyclocomputer is required to be lightweight. Sometimes, a bicycle travels hundreds of kilometers for tens of hours at once, and while the bicycle is thus traveling, the cyclocomputer cannot be removed from the bicycle, and accordingly, the cyclocomputer is required to operate on a small-size power source such as a coin cell battery.

SUMMARY OF THE INVENTION

The present invention contemplates a cyclocomputer that facilitates inputting and outputting information and is also miniaturized and lightweighted, and continues to operate for a long period of time without exchanging batteries or charging a battery.

The present cyclocomputer is attachable to and detachable from a bicycle.

In one aspect, the present cyclocomputer includes: a body; a display provided on an upper surface of the body and displaying prescribed information; a storage provided in the body and storing therein data including at least a portion of the prescribed information; and an NFC tag provided in the body and allowing data communication with an NFC reader writer incorporated in a mobile wireless communication terminal. The NFC tag is composed of an NFC LSI chip and an antenna coil, and often has them both laminated for better handlability. The NFC tag may have the NFC LSI chip and the antenna coil unlaminated.

The above NFC LSI chip is composed of an interface with a microcomputer (e.g., UART, I2C, synchronous serial), an RF front end circuit, a microcomputer, a memory (ROM, RAM, EEPROM), and a power feeding capacitor. The NFC LSI chip can receive electric power from the NFC reader writer and communicate therethrough, via the antenna coil that is connected to the NFC LSI chip. The NFC LSI chip can also receive electric power from a battery of the cyclocomputer. The NFC LSI chip is only required to operate when it receives electric power, and no power source is connected to the NFC tag.

"Mobile wireless communication equipment" as referred to herein includes a multifunctional mobile phone such as a smart phone, a tablet computer, and a setting device dedicated to the cyclocomputer.

The cyclocomputer can perform data communication with a mobile wireless communication terminal, the mobile wireless communication terminal can extract data that is stored in the storage of the cyclocomputer via the NFC LSI chip, and the cyclocomputer can receive, via the NFC reader writer of the mobile wireless communication terminal, data that is stored in the mobile wireless communication terminal or input to the mobile wireless communication terminal via an operation unit of the mobile wireless communication terminal.

The present invention allows a mobile wireless communication terminal's operation unit to be used to perform the above described data communication, and thus allows information to be easily input and output without the necessity of providing the cyclocomputer with an operation unit. More specifically, the present invention facilitates initializing the cyclocomputer and accordingly, sharing the cyclocomputer among a plurality of bicycles having tires with different circumferential lengths.

In one embodiment, the cyclocomputer has a function to indicate that the cyclocomputer has completed data communication with the mobile wireless communication terminal, or a function to cause the mobile wireless communication terminal to indicate that wireless communication is completed. This can facilitate confirming that the data communication is completed.

When the cyclocomputer is provided with the function to indicate that the data communication is completed, the function can be implemented for example by flashing the display of the cyclocomputer, operating a piezoelectric buzzer, a vibration function and/or the like incorporated in the cyclocomputer, and/or the like. The cyclocomputer provided with the above function allows the user to be informed that the communication is completed while the user holds the bicycle by one hand and operates the mobile wireless communication device by the other hand.

When the mobile wireless communication terminal is provided with the function to indicate that the data communication is completed, the function can be implemented for example by flashing a display of the mobile wireless communication terminal, operating any of a vibration function, a flash function and a speaker function incorporated in the mobile wireless communication terminal, and/or the like.

In one embodiment, the cyclocomputer establishes the data communication to transmit information including at least one of a circumferential length of a tire of a bicycle, a cumulative travelled distance, a cumulative travelling time, a current time, an average speed, a maximum speed, a cadence, and GPS information.

"GPS information" as referred to herein includes information regarding satellite orbits (almanac data), and information regarding a locus of movement. For example, transmitting almanac data from the mobile wireless communication terminal to the cyclocomputer immediately after the cyclocomputer is powered on allows the cyclocomputer to rapidly determine a current position. Furthermore, transmitting to the mobile wireless communication terminal a locus of movement that is accumulated in the cyclocomputer having a GPS function incorporated therein allows the mobile wireless communication terminal to be used to visually observe the locus of movement.

In one embodiment, the cyclocomputer includes the display to be capable of implementing a first display state to display first information, and a second display state to display second information, and pushing the body downward to tilt the body allows one of the first and second display states to be switched to the other of the first and second display states.

This allows a display of a limited size to display more information and thus the cyclocomputer to be miniaturized. Furthermore, tilting the body allows a display state to be switched to another, and the cyclocomputer is thus not required to have the body with an upper surface provided with a switch button, and can thus further be miniaturized.

In another aspect, the present cyclocomputer includes: a body; a display provided on an upper surface of the body and displaying prescribed information; a storage provided in the body and storing therein data including at least a portion of the prescribed information; and an NFC tag provided in the body and allowing data communication with an NFC reader writer of a mobile wireless communication terminal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, the present invention will be described in embodiment. Note that identical or corresponding components are identically denoted and may not be described repeatedly.

In describing the following embodiments when a number, an amount and the like are referred to, the present invention is not necessarily limited thereto in scope unless otherwise specified. Furthermore, in the following embodiments, each component is not necessarily essential to the present invention unless otherwise specified.

Figure 1:
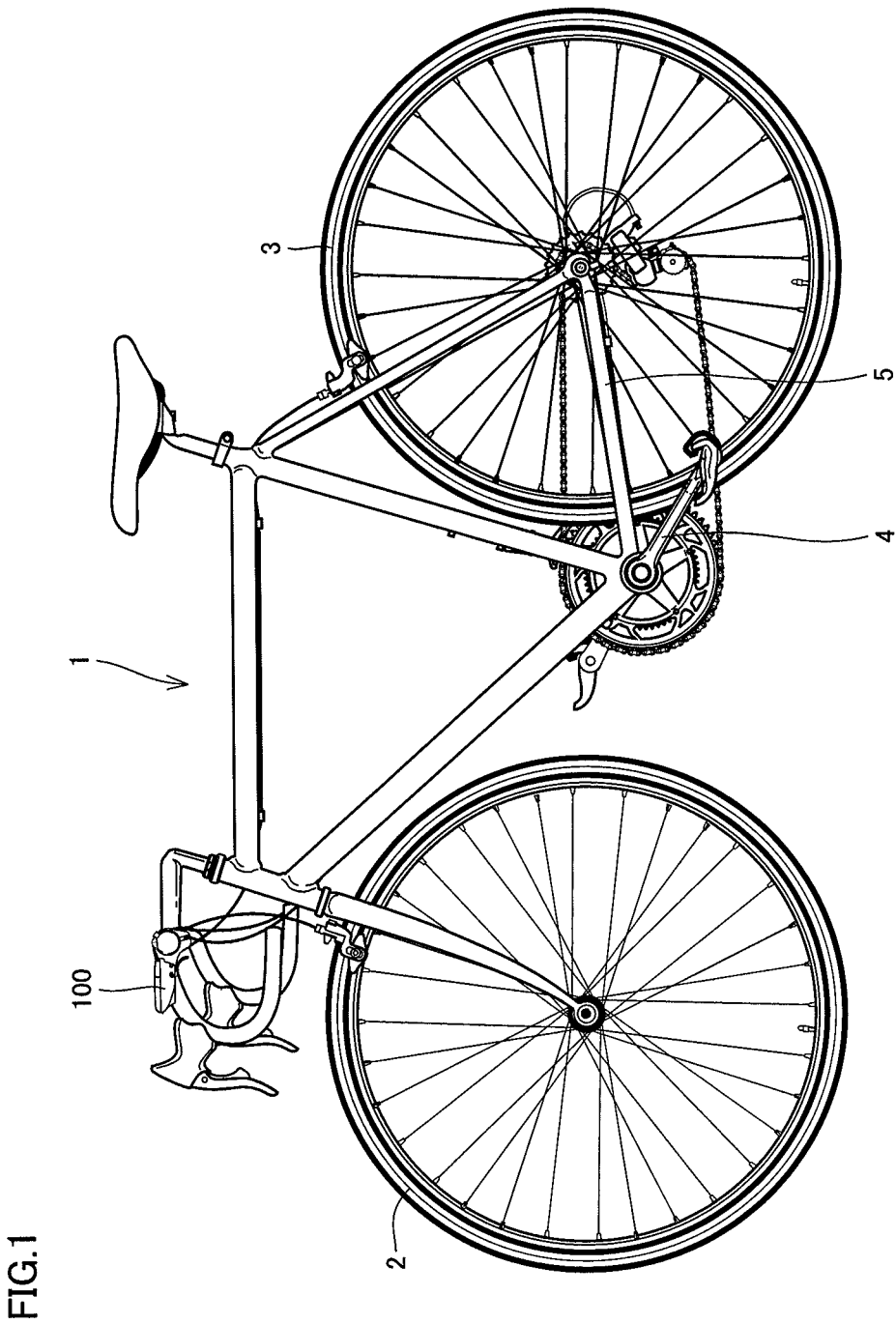
FIG. 1 shows a bicycle to which a cyclocomputer according to one embodiment of the present invention is attached.

FIG. 1 shows a bicycle to which a cyclocomputer according to the present embodiment is attached.

With reference to FIG. 1, a bicycle 1 includes a front wheel 2 and a rear wheel 3, a chain wheel and crank 4 rotating with a pedal, and a chain stay 5. Bicycle 1 has a cyclocomputer 100 attached thereto.

Figure 2:
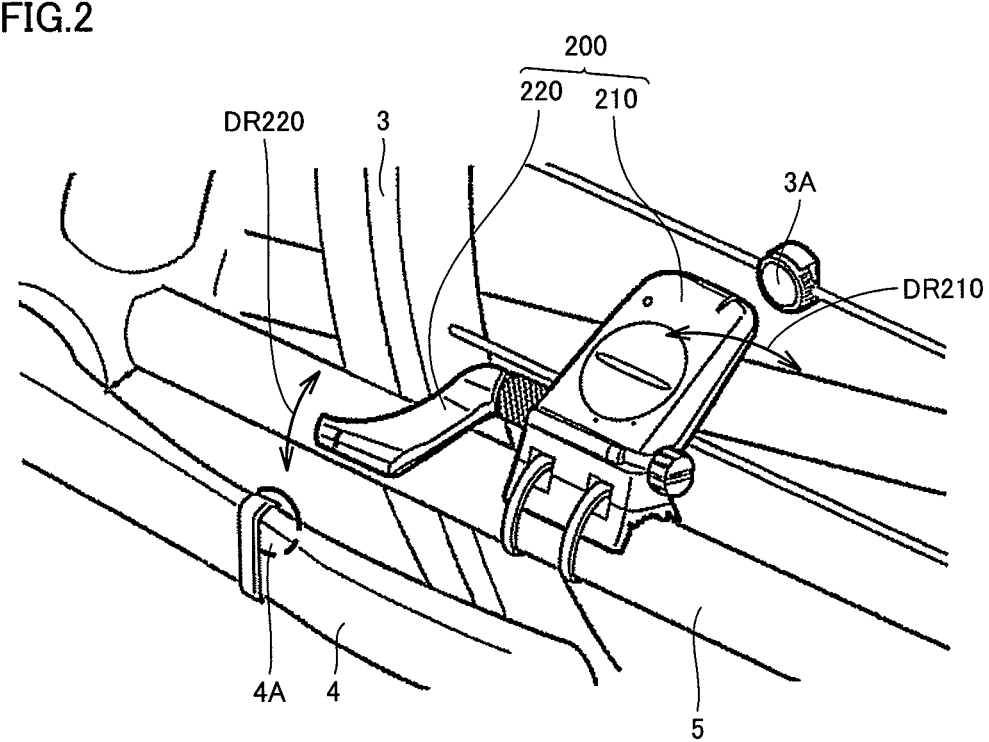
FIG. 2 shows a sensor device, which is attached to the bicycle together with the cyclocomputer shown in FIG. 1, secured to a chain stay of the bicycle.

FIG. 2 shows a sensor device, which is attached to the bicycle together with a display device shown in FIG. 1, secured to the chain stay of the bicycle. With reference to FIG. 2, a sensor device 200 includes a speed sensor 210 and a cadence sensor 220. Rear wheel 3 has a spoke with a magnet 3A attached thereto and chain wheel and crank 4 has a magnet 4A attached thereto. Speed sensor 210 senses passage of magnet 3A, and cadence sensor 220 senses passage of magnet 4A. At what speed bicycle 1 travels and at what pace it is pedaled are thus sensed. More specifically, as magnet 3A passes, rear wheel 3's rotation period T (sec) is detected and bicycle 1's travelling speed V (m/sec) is calculated from rotation period T and rear wheel 3's circumferential length L (m) as V=L/T.

When sensor device 200 is attached to bicycle 1, speed sensor 210 is pivoted in a direction indicated by an arrow DR210, and cadence sensor 220 is pivoted in a direction indicated by an arrow DR220. This can adjust a spacing between speed sensor 210 and magnet 3A and that between cadence sensor 220 and magnet 4A.

Appropriately adjusting the spacings allows speed sensor 210 to sense passage of magnet 3A appropriately, and cadence sensor 220 to sense passage of magnet 4A appropriately.

Figure 3:
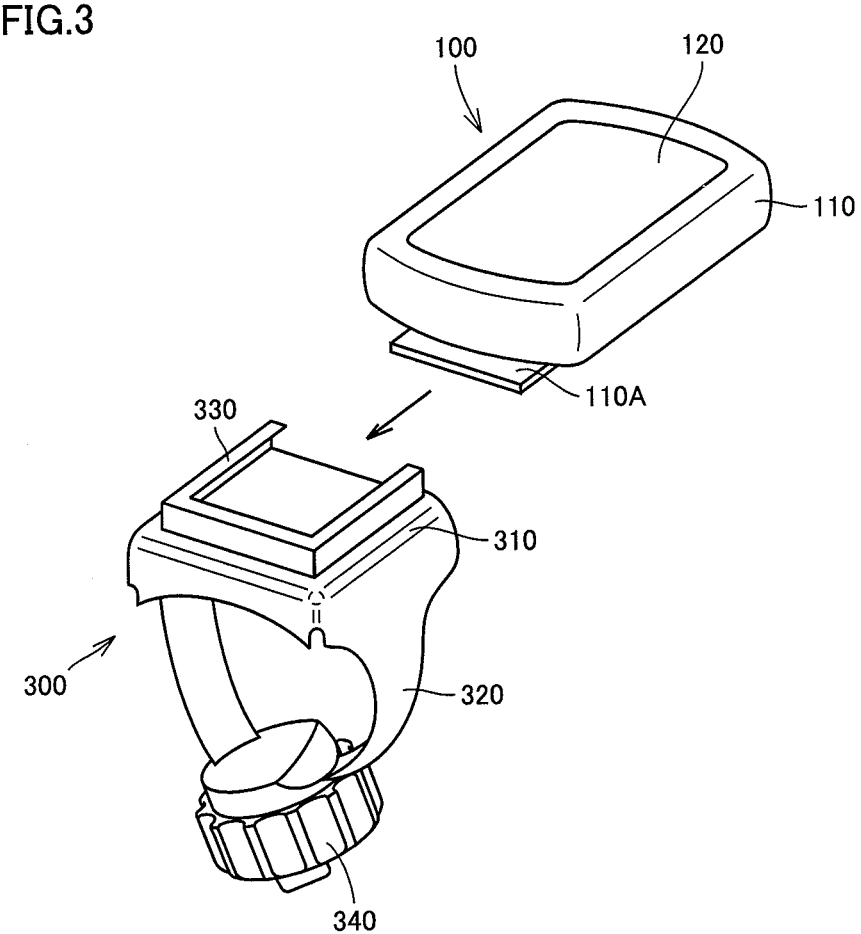
FIG. 3 shows the cyclocomputer being attached to a fixture for securing the cyclocomputer to the bicycle.

FIG. 3 shows cyclocomputer 100 being attached to a fixture 300 for securing cyclocomputer 100 to the bicycle. Furthermore, FIG. 4 shows cyclocomputer 100 completely attached to fixture 300.

Figure 4:
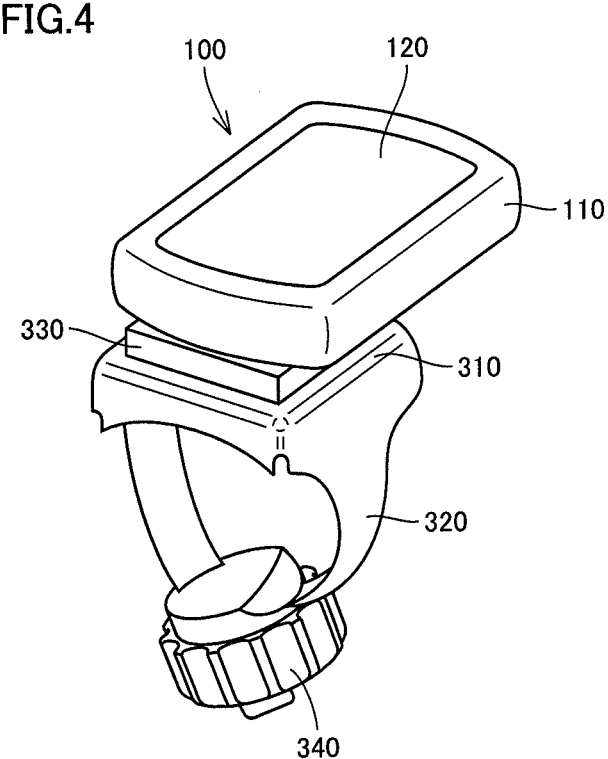
FIG. 4 shows the cyclocomputer completely attached to the fixture.

With reference to FIG. 3 and FIG. 4, cyclocomputer 100 is attached to bicycle 1 via fixture 300. Cyclocomputer 100 includes a body 110 and a display 120. Fixture 300 includes a fixture body 310, a band 320, an engagement portion 330, and a rotary operation unit 340. The cyclocomputer 100 body 110 is slid in a direction indicated by an arrow shown in FIG. 3, to detachably engage an engagement portion 110A of body 110 with engagement portion 330 of fixture 300 to attach cyclocomputer 100 to fixture 300.

Cyclocomputer 100 causes display 120 to for example display a cumulative travelled distance, a cumulative travelling time, a current time, a current speed, an average speed, a maximum speed, a cadence, GPS information, and other similar information. These pieces of information may or may not be displayed on display 120 all at once. When a plurality of pieces of information are not displayed all at once, display 120 implements a "first display state" to display a portion of the plurality of pieces of information, and a "second display state" to display other information. Note that the present invention is not limited to two display states and can implement any plurality of display states.

Note that as shown in FIG. 3 and FIG. 4, fixture 300 is a worm gear type-fixture having rotary operation unit 340. In other words, rotary operation unit 340 can be rotated to tighten/loose band 320.

Figure 5:
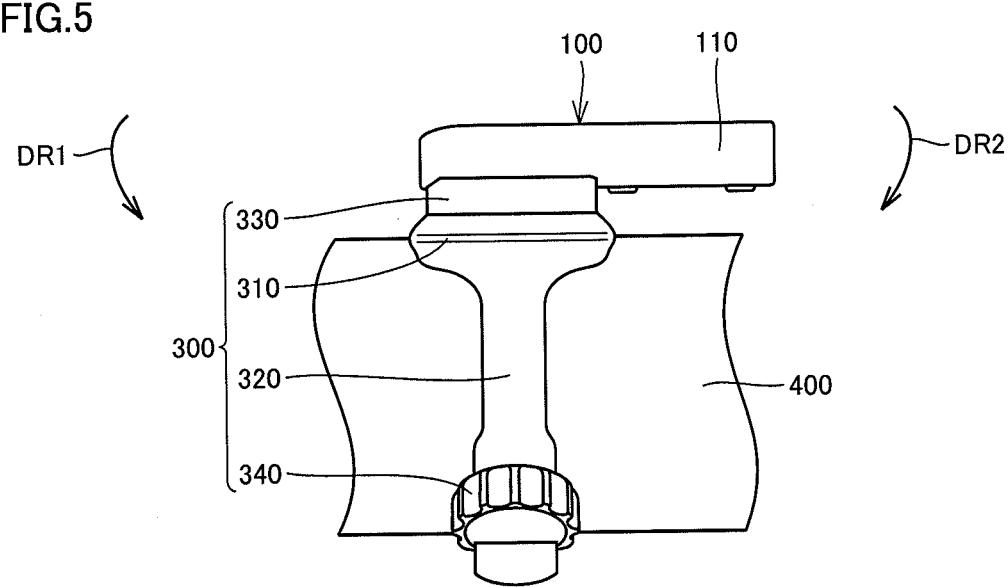
FIG. 5 shows the cyclocomputer secured to the bicycle.

FIG. 5 shows cyclocomputer 100 secured to the bicycle via fixture 300. As shown in FIG. 5, fixture 300 has band 320 wound on and thus clamping a bar 400 of the bicycle to attach the display device to the bar.

Note that while the FIG. 5 example shows cyclocomputer 100 attached to bar 400 extending along bicycle 1 (e.g., a stem), cyclocomputer 100 may be attached to a bar extending across the bicycle (e.g., a handle bar).

Cyclocomputer 100 has body 110 supported on fixture 300 such that body 110 can be tilted in directions DR1 and DR2. When switching an indication to another on the display of cyclocomputer 100, body 110 is pressed downward and thus tilted in direction DR1. This allows a switch button (not shown) that is provided at a lower surface of body 110 to be pressed by fixture 300 into body 110 to activate a switch to switch a display state to another. When the user removes his/her hand from body 110, body 110 tilts back in direction DR2 to its initial state.

When a rider purchases a new cyclocomputer, it is necessary to input prescribed data such as a circumferential length of a tire of a bicycle, a cumulative travelled distance, a current time and the like to that new cyclocomputer (i.e., initialize the cyclocomputer). Furthermore, if the rider rides different bicycles for different purposes, it is necessary to re-initialize the cyclocomputer whenever the rider rides a different bicycle. With a tire's circumferential length referred to to calculate speed and travelled distance, if the rider rides bicycles having tires with different circumferential lengths, in particular, failing to re-initialize the cyclocomputer will result in the cyclocomputer displaying an erroneous indication. On the other hand, cyclocomputer 100 is also required to be simplified in structure and reduced in size, which necessitates cyclocomputer 100 to have a simplified operation unit for entering information. The simplified operation unit is poor in operability for initialization.

Accordingly, the present embodiment provides cyclocomputer 100 to be capable of communicating data with a smart phone to communicate information therewith to allow the smart phone's operation unit to be utilized to initialize cyclocomputer 100. Furthermore, a smart phone can be carried by a rider when the rider leaves for a bicycle tour, and information (time information, positional information, and the like) obtained via the smart phone during the tour can also be transmitted to cyclocomputer 100. Furthermore, the information can also be shared by a plurality of cyclocomputers 100 via the smart phone.

Figure 6:
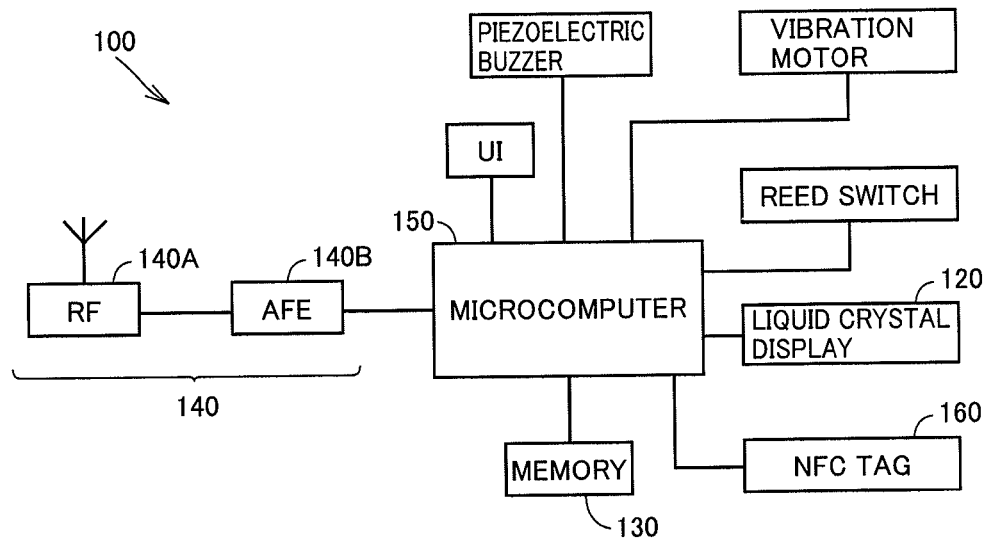
FIG. 6 is a functional block diagram of the cyclocomputer when it performs data communication.
Figure 7:
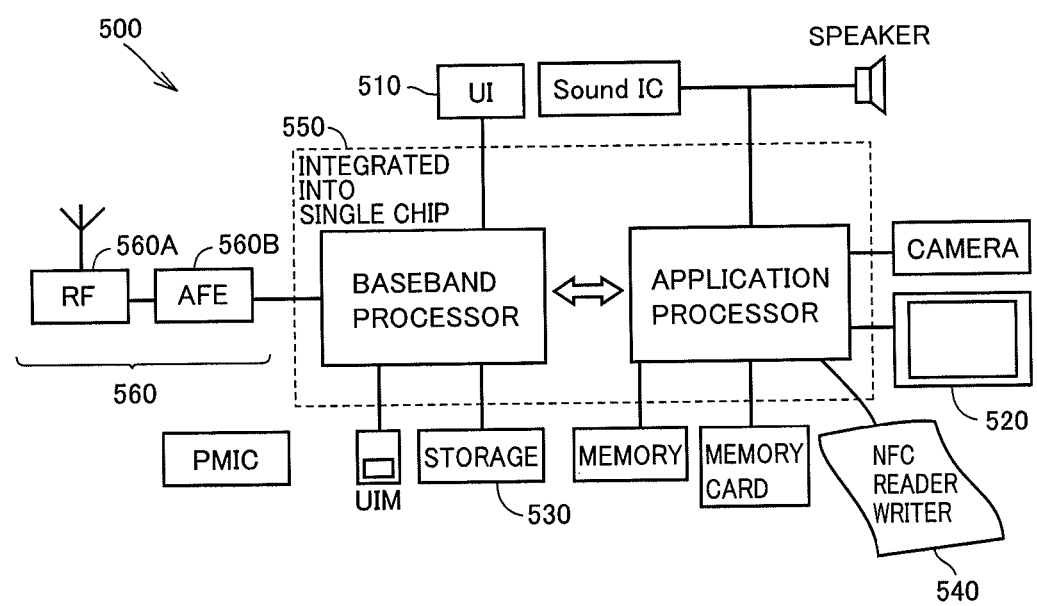
FIG. 7 is a functional block diagram of a mobile wireless communication terminal when it performs data communication.

FIG. 6 and FIG. 7 are functional block diagrams of cyclocomputer 100 and a smart phone (or mobile wireless communication terminal) 500, respectively, performing data communication.

As shown in FIG. 6, cyclocomputer 100 includes body 110 and display 120, and in addition, a storage 130 internal to body 110, a wireless communication unit 140 (a radio frequency, wireless circuit unit 140A, and an analog front end, analog-to-digital/digital-to-analog conversion processing unit 140B), and a control unit 150 that controls display 120, storage 130, and wireless communication unit 140 operatively. Storage 130 stores data displayed on display 120. Wireless communication unit 140 is a component that performs data communication with speed sensor 210 and cadence sensor 220. NFC tag 160 communicates data that is stored in storage 130 with an NFC reader writer 540 in accordance with a specification of NFC communication.

As shown in FIG. 7, smart phone 500 includes an operation unit 510 operated by a user to input prescribed operation information, and a display 520 that displays prescribed information. For example, a touch-sensitive liquid crystal display may serve as both operation unit 510 and display 520.

Storage 530 is a component that stores prescribed information, and NFC reader writer 540 is a component that performs data communication with NFC tag 160 of cyclocomputer 100. Wireless communication unit 560 is a component that establishes physical connection with a mobile phone communication network or a WiFi communication network. Control unit 550 operates in response to how operation unit 510 is operated and the like to control display 520, storage 530, and wireless communication unit 560 operatively.

NFC tag 160 of cyclocomputer 100 receives from smart phone 500 via NFC reader writer 540 data that is stored in smart phone 500 at storage 530 or input to smart phone 500 via operation unit 510. The received data is transmitted to storage 130.

Figure 8:
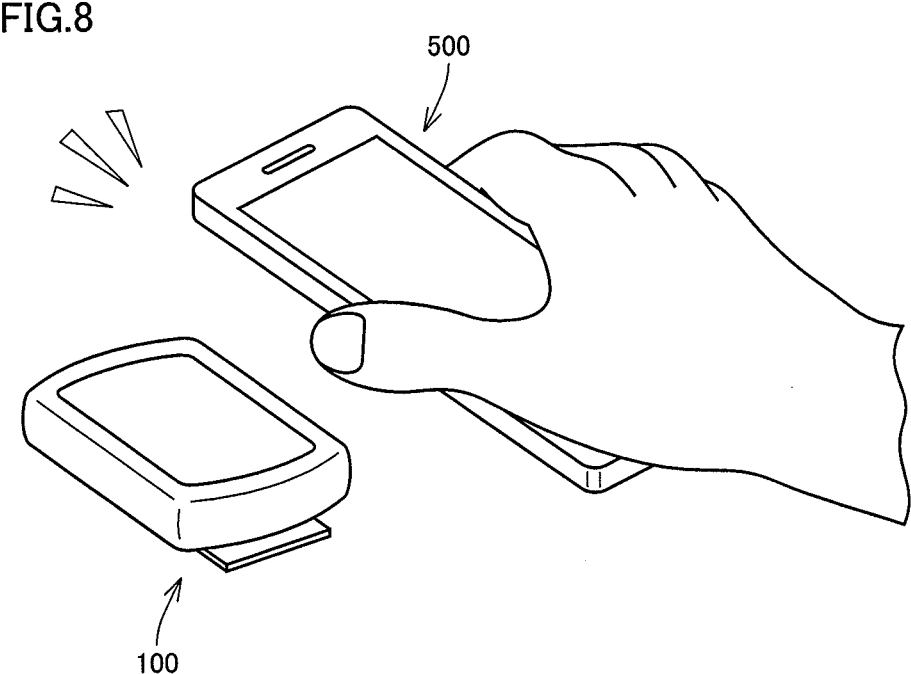
FIG. 8 shows the cyclocomputer and the mobile wireless communication terminal communicating data therebetween.

FIG. 8 shows cyclocomputer 100 and smart phone 500 communicating data therebetween. As shown in FIG. 8, smart phone 500 is held still near cyclocomputer 100 for a period of time (for example of about 0.5 second) to perform designated, desired wireless data communication. Once the data communication has been completed, cyclocomputer 100 and/or smart phone 500 inform/informs the user accordingly. For example, displays 120, 520 may be flashed or turned on or a flash function, a vibration function, and/or the like may be used.

Note that the above wireless data communication's contents, e.g., a tire's circumferential length, a current time, a cumulative traveled distance, and the like, are designated on smart phone 500. In order to do this operation, it is necessary to previously install dedicated application software in smart phone 500.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A cyclocomputer attachable and detachable from a bicycle, comprising:
   a body;
   a display provided on an upper surface of said body and displaying prescribed information;
   a storage provided in said body and storing therein data including at least a portion of said prescribed information; and
   an NFC tag provided in said body and allowing NFC communication with a mobile wireless communication terminal, said NFC tag adapted to receive electric power from said mobile wireless communication terminal,
   the cyclocomputer being capable of transmitting via said NFC tag to said mobile wireless communication terminal at least a portion of said data stored in said storage,
   the cyclocomputer being capable of receiving from said mobile wireless communication terminal via said NFC tag at least a portion of other data stored in said mobile wireless communication terminal or input, including at least one of a circumferential length of a tire of a bicycle, a cumulative travelled distance, a cumulative travelling time, a current time, an average speed, a maximum speed, a cadence, or GPS information to said mobile wireless communication terminal via an operation unit of said mobile wireless communication terminal.

2. The cyclocomputer according to claim 1, having a function to indicate that said cyclocomputer and said mobile wireless communication terminal have completed NFC communication therebetween, or a function to cause said mobile wireless communication terminal to indicate that said NFC communication is completed.

3. The cyclocomputer according to claim 1, wherein:
   said display is capable of implementing a first display state to display first information, and a second display state to display second information; and
   pushing said body downward to tilt said body allows one of said first and second display states to be switched to the other of said first and second display states.

* * * * *